UNITED STATES PATENT OFFICE.

ROBERT D. PIKE, OF SAN FRANCISCO, CALIFORNIA.

METHOD OF PRODUCING GRANULAR CARBON FROM GAS REFUSE.

1,207,694.　　　Specification of Letters Patent.　　Patented Dec. 5, 1916.

No Drawing.　　Application filed April 1, 1916.　Serial No. 88,418.

*To all whom it may concern:*

Be it known that I, ROBERT D. PIKE, a citizen of the United States, residing in the city and county of San Francisco and State of California, have invented certain new and useful Improvements in Methods of Producing Granular Carbon from Gas Refuse, of which the following is a specification.

The present invention relates to a process for the manufacture of a highly purified form of carbon from the waste materials resulting from the manufacture of illuminating gas from petroleum, and has for its objects first the utilization of said waste products, and second the production of carbon, preferably granular in texture, of a very pure grade, which is especially suitable for use in the manufacture of electric primary batteries of the so-called dry type.

The manufacture of illuminating gas from crude petroleum, as ordinarily accomplished, results in the formation of a refuse material comprising finely divided carbon, or lamp black, and oil tar. The major portion of the oil tar is taken off separately, as such, but a certain amount thereof is contained in the lamp black. The lamp black also contains some water, for the reason that water is used to precipitate it, and where salt water is used for this purpose, as is the case in gas plants located on or near the sea coast or other bodies of salt water, a certain amount of soluble salts, resulting in a soluble ash content, is contained in the lamp black. This soluble ash must be removed before the lamp black can be used to make a relatively pure grade of carbon. In any case, the lamp black as received from the gas plant, whether precipitated with salt or fresh water, contains some insoluble ash, but as this amounts to less than one-half of one per cent., its presence is negligible.

The oil tar contains practically no fixed impurities; that is, none that cannot be driven off by heat in a manner hereinafter described. Therefore, the carbon resulting from my process, which utilizes only these two materials, namely lamp black and oil tar, has a higher degree of purity than any similar product now commercially obtainable, and its electrical resistance is lower. This quality renders my carbon more suitable for electrical uses, such as the manufacture of dry batteries, than the products at present used. These latter must be mixed with pure carbon, in the form of graphite, to lower their electrical resistance. Graphite is an expensive material, and therefore my carbon, which necessitates the use of far less graphite, provides an economical, as well as a particularly suitable material for such uses.

My invention consists in the following process: Lamp black containing soluble impurities, that is particularly, lamp black which has been precipitated with sea water, must be preliminarily purified. This is done by first agitating the lamp black with hot water, a process which causes the tar contained in the lamp black to separate out in the form of flakes or granules. The suspended material is then passed through a screen having a mesh, preferably of one-eighth of an inch, which removes the tar granules and flakes, and allows the tar-free lamp black to pass through.

Continued washing with water of both lamp black and tar, separately, results in the removal, by solution, of the soluble impurities. The purification of the lamp black is more complete than that of the tar, but in either the amount of remaining impurities is negligible. The result of this preliminary purification is the production of a quality of lamp black essentially similar to that received from gas plants in which fresh water is used for precipitation, except that the artificially purified product is free from tar as well as soluble impurities. The presence of a limited amount of tar in the lamp black, however, has no material effect on its subsequent treatment, the removal of said tar from the lamp black as described above being incidental, although necessary to the removal of the soluble impurities. Likewise, the tar removed from the lamp black, although granular in texture, is essentially similar to that received as such from the gas plant, and is used, as hereinafter described, in an identical manner.

The lamp black, whether received in a pure state or preliminarily purified as above described, is first dried, at a low temperature, to remove most of the water contained therein. To it is then added oil tar, either as received from the gas plant or from the preliminary purification process, in sufficient quantity to make a semi-plastic mass. The resulting mixture is preferably formed, by compression, into cakes for convenience in subsequent handling, but this step is not necessary to the final success of the process. The material, whether in the form of cakes or as a mass, is then placed in retorts of some refractory substance, as for example fire-clay, and heated, in a furnace, to incandescence for a sufficient time to drive off all the volatile products, most of which, as before stated, are contained in the oil tar. This firing results in the formation of a rather hard mass, somewhat resembling coke in appearance, of carbon in a very nearly pure state, which is then ground in a suitable mill to the desired degree of granulation.

For the manufacture of dry batteries, a fineness of about 120 grains to the inch is desirable, although the carbon may be ground to other degrees of fineness for other purposes. As a final precautionary step, the granulated carbon is passed through a magnetic separator to remove any magnetic impurities, as, for example, iron chips from the grinding mill. It is then ready to be used in the manufacture of dry batteries or other products in any desired manner.

In the production of carbon according to the above described process, coal tar may be used in place of oil tar with equal success, but inasmuch as both lamp black and oil tar are the usual waste products from the manufacture of illuminating gas from petroleum, the oil tar is more preferable from a commercial standpoint.

Having thus described my invention, what I claim as new and desire to protect by Letters Patent is:—

1. The method of producing granular carbon from "lamp black" derived from the refuse of oil gas manufacture, which consists in eliminating moisture therefrom, intermixing oil tar therewith, heating the said mixture to a temperature to expel all volatile products therefrom, and reducing the residue into a finely divided condition.

2. The method of producing granular carbon from lamp black and oil tar which consists in heating the lamp black to a relatively low temperature to expel the water therein contained, mixing the dried lamp black and the oil tar in suitable proportions to form a semi-plastic mass, heating said mixture to a high temperature to expel all volatile products, and grinding the residue into a finely divided condition.

3. The method of producing granular carbon from lamp black and oil tar which consists in heating the lamp black to a relatively low temperature to expel the water therein contained, mixing the dried lamp black and the oil tar in suitable proportions to form a semi-plastic mass, compressing said mass into cakes, heating said cakes to a high temperature to expel all volatile products, and reducing the residue to a finely divided condition by grinding.

4. The method of producing granular carbon from lamp black and oil tar which consists in heating the lamp black to a relatively low temperature to expel the water therein contained, mixing the dried lamp black and the oil tar in suitable proportions to form a semi-plastic mass, compressing said mass into cakes, heating said cakes to a high temperature to expel all volatile products, reducing the residue to a finely divided condition by grinding, and removing any magnet material from the ground residue by magnetic separation.

5. The method of producing carbon from lamp black and oil tar which consists in mixing the lamp black with the oil tar in suitable proportions to form a semi-plastic mass, compressing said mass into cakes, heating said cakes to a high temperature to expel all volatile products, and reducing the residue to a finely divided condition by grinding.

6. The method of producing granular carbon from lamp black and oil tar which consists in agitating the lamp black with hot water to remove soluble impurities, heating the purified lamp black at a low temperature to expel the water, mixing the dried lamp black with the oil tar in suitable proportions to form a semi-plastic mass, heating said mass to a high temperature to expel all volatile products, and reducing the residue to a finely divided condition by grinding.

7. The method of producing granular carbon from lamp black and oil tar which consists in agitating the lamp black with hot water to remove soluble impurities, heating the purified lamp black at a low temperature to expel the water, mixing the dried lamp black with the oil tar in suitable proportions to form a semi-plastic mass, compressing said mass into cakes, heating said cakes to a high temperature to expel all volatile products, and reducing the residue to a finely divided condition by grinding.

8. The method of producing granular carbon from lamp black and oil tar which consists in agitating the lamp black with hot water to separate the oil tar contained therein and to remove soluble impurities, removing the separated oil tar by screening, drying the purified lamp black and the separated oil tar, mixing said lamp black and said oil tar with additional oil tar in sufficient proportions to form a semi-plastic mass, heating said mass to a high temperature to expel all volatile products, and reducing the residue to a finely divided condition by grinding.

In testimony whereof I have signed my name to this specification in the presence of a subscribing witness.

ROBERT D. PIKE.

Witness:
D. B. RICHARDS.